Aug. 12, 1941.　　　　G. A. CARLSON　　　　2,252,594
ROTARY WORK HOLDING MACHINE
Original Filed June 30, 1938　　4 Sheets-Sheet 1

INVENTOR.
Gustave A. Carlson
BY
ATTORNEY.

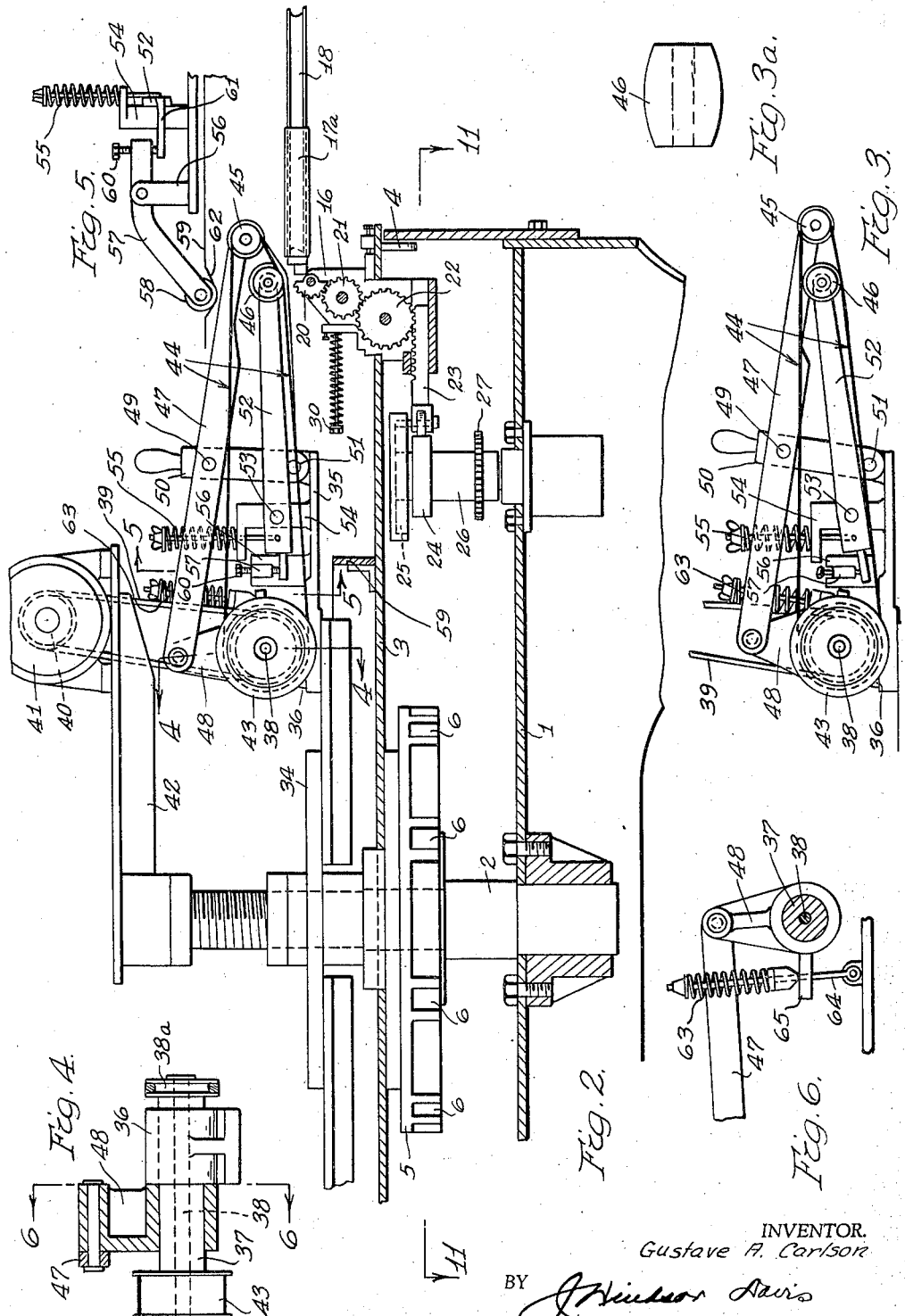

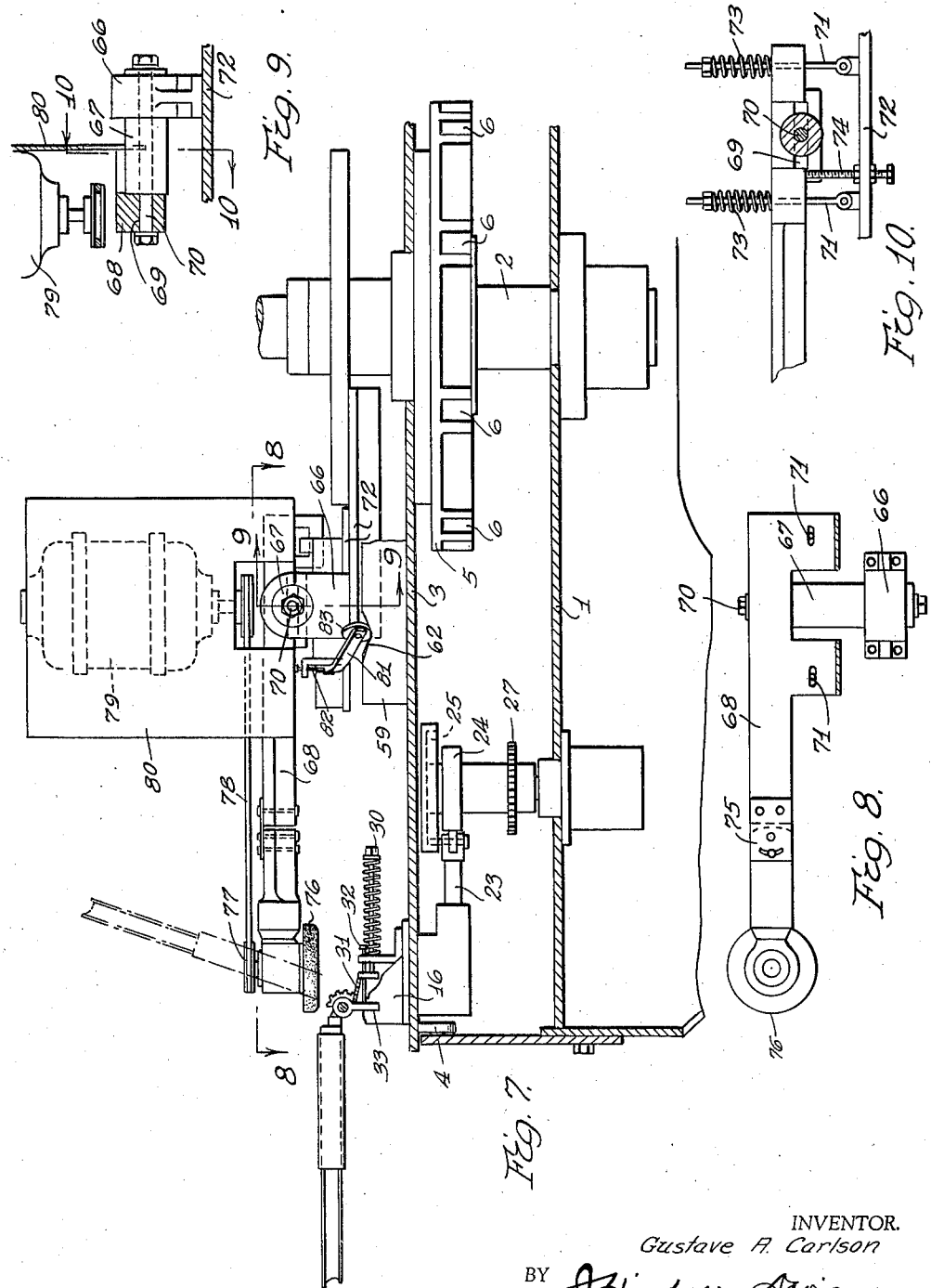

Aug. 12, 1941.  G. A. CARLSON  2,252,594
ROTARY WORK HOLDING MACHINE
Original Filed June 30, 1938   4 Sheets-Sheet 4
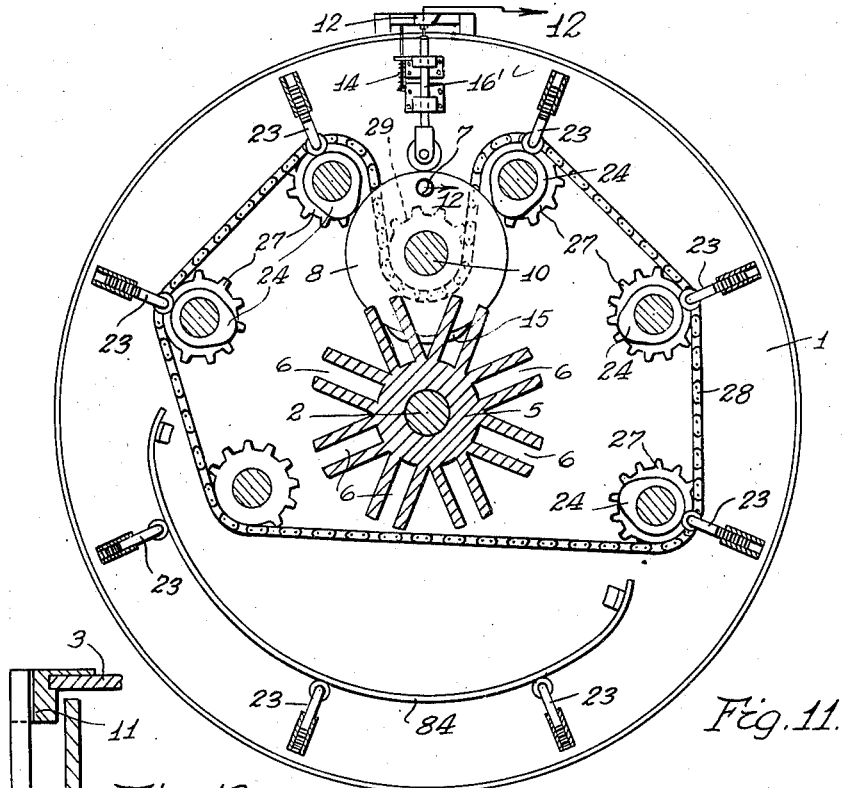
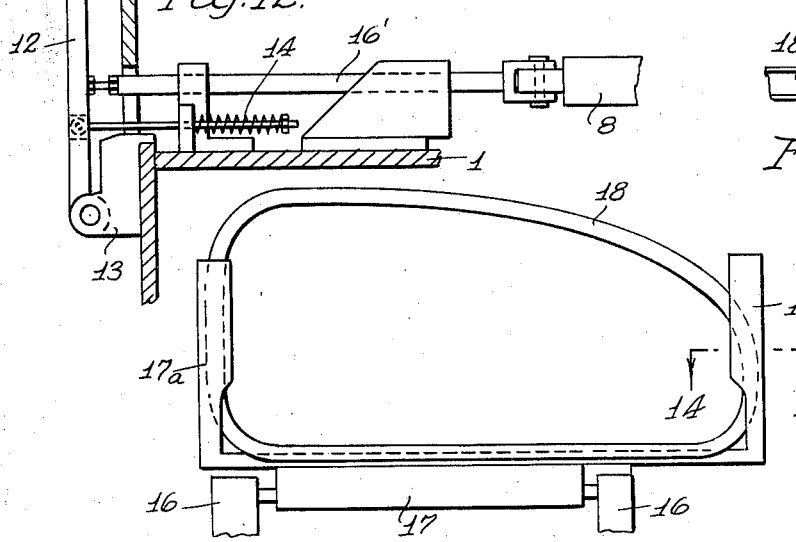
INVENTOR.
Gustave A. Carlson
BY
ATTORNEY.

Patented Aug. 12, 1941

2,252,594

UNITED STATES PATENT OFFICE 2,252,594

ROTARY WORK HOLDING MACHINE

Gustave A. Carlson, Detroit, Mich.

Refiled for abandoned application Serial No. 216,698, June 30, 1938. This application May 1, 1940, Serial No. 332,817

7 Claims. (Cl. 51—3)

This application is a re-filing of application Serial No. 216,698, filed June 30, 1938, which became abandoned for failure to respond to an office action within six months. This invention relates to apparatus for grinding and polishing metal objects and has for its primary object to provide a machine for removing weld flashes from trim articles such as, for example, the garnish moldings which ordinarily decorate window openings of automobiles.

Another object is to provide a machine embodying a plurality of work performing members arranged in a series ranging from rough grinding to finish grinding, a plurality of work holders and a table revolvable about a vertical axis carrying said work holders and adapted, by revolving, to present work pieces on the holders to the several work performing members, successively. The work holders are loaded at a given point, the loading station, and by the completion of one revolution of the table, are presented to the several work performing members and are returned to the same point. As a result of movement of the work holders through a circular path they may be loaded and unloaded at a single station and work performing members may be grouped as closely as desired along the entire path of movement of the work holders.

Another object is to provide means for revolving the table periodically and for automatically stopping and locking the table with the work holders located in an operative relationship with work performing members, said locking means being automatically rendered inoperative at the expiration of a period of time sufficient to permit each work performing member to complete its particular stage of the work function.

It is, therefore, an object to provide a machine which will progressively present work to successive work performing means at successive stations whereby a plurality of consecutive operations may be performed thereon, to progress of the work being interrupted at each station to permit a cyclic movement of the work in presenting large or non-planar surfaces to the work performing means, and thereafter continued to the next station.

Another object is to provide means for automatically removing the work performing members from the path of movement of the work pieces while the table is in motion, and for automatically placing the work performing members in contact with the work pieces when the table is stationary.

Another object is to provide means automatically operative when the table is stationary and the work performing members are in contact with the work pieces for pivoting the work holders whereby work pieces having curved or arcuate sections are treated by the work performing members throughout their entire width.

Another object is to provide means yieldingly supporting the work performing members whereby they are capable of following the contour of the work pieces during pivoting thereof, and means for maintaining a substantially constant pressure between the work performing members and the work pieces during such pivoting.

Another object is to provide a machine for handling frame-like work pieces embodying pivoted work holders adapted to hold the work pieces in a horizontal position during movement of the table to thereby enable positioning of the work performing members above the path of movement of the work pieces. When the work pieces are positioned opposite the work performing members, the latter are lowered into contact therewith, and the work pieces are pivoted to an erect position and then back to the horizontal, thus enabling the work performing members to contact the entire width thereof.

In the accompanying drawings:

Fig. 2 is a fragmental vertical section illustrating one of the work performing members in elevation;

Fig. 3a is an elevation of a detail;

Fig. 3 is an elevation of the work performing member of Fig. 2, illustrating another position thereof;

Figure 1:
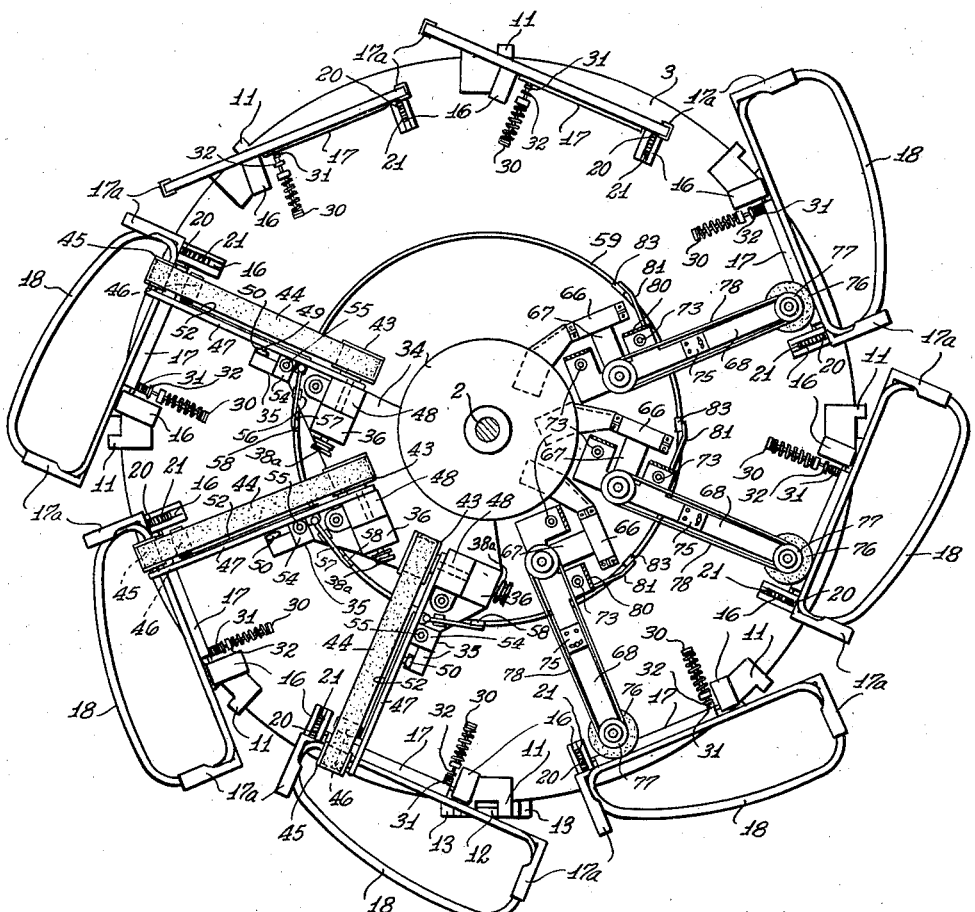
Fig. 1 is a plan view of the machine with some of the uppermost parts removed to expose the mechanism therebeneath.

Figs. 4 and 5 are sections taken on lines 4—4 and 5—5, respectively, of Fig. 2;

Fig. 6 is a section taken on the line 6—6 of Fig. 4;

Fig. 7 is a fragmental vertical section of the machine, illustrating another work performing member;

Figs. 8 and 9 are sections taken respectively on the lines 8—8 and 9—9 of Fig. 7;

Fig. 10 is a section taken on the line 10—10 of Fig. 9;

Fig. 11 is a horizontal section taken on the plane indicated by the line 11—11 of Fig. 2;

Fig. 12 is a section taken on the line 12—12 of Fig. 11;

Fig. 13 is an elevation of a work holder, and

Fig. 14 is a section taken on the line 14—14 of Fig. 13.

The present machine comprises a stationary table in which is centrally mounted a vertical stationary post 2. Rotatable about the post 2 is a table 3 which is supported adjacent its periphery by rollers 4. Attached to the table 3 is a disc 5 having a plurality of radially extending ways 6 adapted to receive a pin 7 on a rotatable element 8 whereby the table 3 is rotated a fraction of a revolution with each revolution of the element 8. The disc 5, its ways 6, the pin 7 and the rotatable element 8 constitute a Geneva movement and are caused to function by operation of a motor (not shown) mounted beneath the table 1 and connected to the vertical shaft 10 which carries the rotatable element 8.

Mounted at spaced intervals about the circumference of the rotatable table 3 are locking lugs 11, and a pivoted latch 12 is adapted to engage the lugs 11 to prevent rotary movement of the table 3. The latch 12 is pivoted in a bracket 13 and has a spring 14 urging movement thereof in a direction to engage the lugs 11. On the rotatable element 8 is a cam 15 which engages an adjustably extensible plunger 16' with each revolution of the element 8 to move the latch 12 from engagement with the lugs 11 as the pin 7 moves into operative relationship with one set of ways 6.

Accordingly, the table 3 is intermittently moved a predetermined fraction of a revolution, and is positively locked against movement when its intermittent moving means is inoperative.

A plurality of work receiving fixtures are mounted on the table 3 spaced about the periphery thereof distances equal to the distance a point on the periphery travels with each intermittent movement. Each fixture comprises a pair of brackets 16 rotatably supporting a work holder 17 having two substantially U-shaped arms 17a into which a frame-like work element 18 may be manually inserted. As may be seen in Fig. 2, each work support 17 has a gear sector 20 connected thereto and meshing with a gear 21 which in turn meshes with a gear 22. A slidable rack 23 meshes with the gear 22 and is adapted to be moved in one direction by a cam 24 and in the other direction by a cam 25. The several cams 24 and 25 are mounted on shafts 26 having sprockets 27 thereon, and the several sprockets 27 are connected by a chain 28 which is driven by a sprocket 29 on the above described driven shaft 10.

As the table 3 comes to rest and is locked against movement, each cam 24 has one of the racks 23 positioned opposite the same, and as the cams 24 and 25 are all rotated in unison, the racks 23 are reciprocated and cause the work support 17 to pivot through at least one hundred and eighty degrees. The normal position of the work holder is substantially horizontal and, as shown in Fig. 7, a spring pressed plunger 30 is connected to each work holder by a chain 31 to bias movement toward the horizontal. An adjustable set screw 32 acts upon a radial arm 33 to positively restrict pivotal movement of the work holder and to thereby relieve the cams 24 and 25 of friction.

Mounted on the stationary post 2 are a plurality of brackets 34 supporting work performing units such as that shown in Figs. 2 to 6, and each of which comprises a base 35 having a bracket 36 supporting a trunnion shaft 37. A shaft 38, extending through the trunnion shaft 37, has a pulley 38a on one end operated by a belt 39, pulley 40 and motor 41. The motor 41 is carried by a bracket 42 on the vertical post 2. On the other end of the shaft 37 is a pulley 43 over which an endless grinding band 44 is trained, the other end of the band 44 being trained over two pulleys 45 and 46. The pulley 45 is supported at the free end of an arm 47 which is pivotally connected to a radially extending arm 48 journalled on the trunnion shaft 37. Intermediate its ends the arm 47 is pivotally connected at 49 to a lever 50 which is pivoted at 51 on the bracket 35.

The roller 46 is supported by an arm 52 which is pivoted at 53 on a stationary bracket 54, and a spring 55 acts upon the arm 52 to bias pivotal movement thereof in a direction, pushing it against the band 44. The spring 55 may be adjusted to vary the pressure exerted by the arm 52 and roller 46 on the band 44, and the roller 46 presses against the band at a point directly opposite where the band contacts the work piece.

Mounted on a stationary bracket 56 is a lever 57 having a roller 58 thereon which rides on top of an annular cam 59 carried by the rotatable table 3. On its other end the lever 57 has an adjustable set screw 60 which engages a projection 61 on the arm 52. The cam 59 has a plurality of notches 62 spaced apart a distance equal to the distance a point on the cam travels with each fraction of a revolution of the table 3, and as the roller 58 rides the cam 59 the lever 57 is rocked to a position where it pivots the arm 52 to the elevated position shown in Fig. 3, and as the roller falls into one of the notches 62, as it does each time the table 3 comes to rest, the arm 52 falls to the position shown in Fig. 2.

As shown in Fig. 3, the band 44 is elevated to a position where the work fixtures may pass thereunder, providing they are horizontally disposed, and in order to maintain the band 44 taut a spring 63 is supported by a rod 64 and acts upon a radial arm 65 connected to the arm 48 whereby the latter pivots and shifts the arm 47 in a direction tightening the band 44.

In the position shown in Fig. 2 it may be assumed that the table 3 has just come to rest, the roller 46 has been lowered, and immediately following this stage the cams 24 and 25 reciprocate the racks 23 and pivot the fixtures 17 whereby the work pieces carried thereby contact the bands 44. In other words, the fixtures 17 will pivot to a substantially erect position and then back to the horizontal position prior to the next movement of the table.

In Figs. 7, 8, 9 and 10, there is shown a disc type grinding or finishing unit comprising a bracket 66 carrying a rotatable spindle 67. An elongated arm 68 is provided with a lengthwise extending slot 69 through which a bolt 70 extends and secures the arm to the spindle 67. Rods 71 are pivotally connected to the support 72 of the bracket 66 and have springs 73 thereon which act upon the arm 68 to normally maintain it horizontal. A set screw 74 restricts pivotal movement of the arm 68 in one direction.

The arm 68 is formed of two sections pivotally joined together at 75, whereby the outer end thereof may be angularly disposed. On the outer end of the arm 68 is a disc grinder 76 having an operating pulley 77. The pulley 77 is driven through a belt 78 by an electric motor 79 carried by a plate 80 attached to the arm 68 directly over the spindle 67. Connected to the arm 68 is a lever 81, adapted to be adjusted by a set screw 82, and having a roller 83 riding upon the cam 59.

As shown in Fig. 7, the arm 68 is lowered so that as the work holder 17 adjacent thereto is pivoted the work carried by the fixture contacts the disc 76. In this position, the roller 83 is in one of the notches 62, and as the table 3 again moves the roller is elevated and results in elevation of the arm 68.

From the foregoing it becomes apparent that as the work holders 17 come to rest opposite the cams 24 and 25 they are pivoted to an erect position and back to the horizontal. During this pivotal movement the work pieces are worked upon and in the case of garnish moldings the flash resulting from welding the same may be ground away and the surface finished and smoothed. The band grinders are the rough grinders, and in order that they will not mar surfaces adjacent the flash the rollers 46 are crowned as shown in Fig. 3a. With a plurality of work performing units, as here disclosed, each may perform one stage in the finishing process, and as the work pieces travel once around the table they may be completely finished.

It is more convenient to load and unload the work holders while they are vertical, and for this purpose a cam 84 is mounted on the stationary table 1 whereby the racks 23 contact the same as the table rotates. The cam 84 forces the racks outwardly and pivots the work holders to a vertical position, in which position they remain for a substantial fraction of rotation of the table 3.

What is claimed is:

1. In apparatus of the character described, a revolvable table, a plurality of work holders on said table, a plurality of work performing members arranged about the table, means for revolving said table intermittently and for stopping the table with work holders positioned opposite work performing members, means for moving the work performing members into contact with work pieces carried by the holders, means for moving work holders adjacent work performing members through a complete cycle of reverse movements, and means for moving and holding the remaining work holders at the mid-point in their cycle of reverse movements.

2. In apparatus of the character described, a revolvable table, a plurality of work holders on said table, a plurality of work performing members arranged about the table, means for revolving said table intermittently and for stopping the table with work holders positioned opposite work performing members, means for moving the work performing members into contact with work pieces carried by the holders, means for pivoting the work holders adjacent work performing members through a complete cycle of reverse movements, and means for holding the remaining work holders at the mid-point of their cyclic movements.

3. In apparatus of the character described, a revolvable table, a plurality of work holders on said table, a plurality of tiltable work performing members arranged about the table, means for revolving said table intermittently and for stopping the table with work holders positioned opposite work performing members, means for moving the work performing members into contact with work pieces carried by the holders, and means for moving other work holders to an erect position and for holding said other work holders in an erect position for reception or removal of work pieces.

4. In apparatus of the character described, in sub-combination, a rotary table, means for intermittently moving said table, means for stopping said table at predetermined points in its rotation and for predetermined periods of time, work holders carried by said table, reciprocating means for pivoting said work holders in one direction, spring means for pivoting said work holders in the other direction, cams located and timed with respect to the movement of said table whereby they move said reciprocating member against the opposition of the spring means when said table is stationary, and a cam adapted to pivot the work holders in the first direction during a predetermined stage in the travel of said table and to hold said work holders against movement in the second direction during said travel stage.

5. In apparatus of the character described, a work holder for receiving frame-like work pieces, means for moving said work holder in a definite path between a loading station and an unloading station, a plurality of work performing members positioned adjacent the path of movement of the work holder, means for periodically moving the work holder to position it adjacent each performing member successively, means operative during movement of the work holder for holding the work holder in a position with the frame-like work pieces horizontally disposed, means operative during each period of rest for actuating the work holders positioned adjacent the work performing members to swing the work pieces from their original position to an erect position and then back to their original position before resumption of travel to the next succeeding work performing member, and means for moving the work performing members into contact with the work piece on the holder during swinging movement of the work piece.

6. In apparatus of the character described, a revolvable table, a plurality of work holders carried by said table and adapted to receive frame-like work pieces, a work performing member positioned adjacent the table, means for intermittently revolving said table and for stopping said table as each work holder is positioned opposite the work performing member, means operative during movement of the table for holding the work holder in a position with the work pieces carried thereby in a substantially horizontal position, means for moving the work performing member contact with a work piece on each holder as it is positioned adjacent thereto, and means operative during each period of rest of the table for actuating the work holder adjacent the work performing member to swing the work piece from its original position to a substantially erect position and back to its original position before resumption of movement of the table.

7. In apparatus of the character described, a revolvable table, a plurality of work holders carried by said table and adapted to receive frame-like work pieces, work performing members positioned above said table, means for intermittently revolving said table and stopping said table with work holders positioned adjacent work performing members, means operative during movement of the table holding the work holders with the work pieces substantially horizontally disposed for clearance beneath the work performing member, means operative during each period of rest for actuating the work holders to swing the work pieces from their original position to a substantially erect position for contact of inner surfaces of the work pieces with work performing members and then back to their original position before resumption of movement of the table, and means for lowering the work performing members for contact with work pieces carried by work holders positioned adjacent thereto.

GUSTAVE A. CARLSON.